(12) United States Patent
Homma et al.

(10) Patent No.: US 10,252,307 B2
(45) Date of Patent: Apr. 9, 2019

(54) HIGHLY-VISCOUS SUBSTANCE DISPENSING METHOD AND HIGHLY-VISCOUS SUBSTANCE DISPENSING APPARATUS

(71) Applicant: NITTAN VALVE CO., LTD., Kanagawa (JP)

(72) Inventors: Koichi Homma, Kanagawa (JP); Masaaki Niiro, Kanagawa (JP); Daiki Sato, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 38 days.

(21) Appl. No.: 15/542,607

(22) PCT Filed: May 15, 2015

(86) PCT No.: PCT/JP2015/064060
§ 371 (c)(1),
(2) Date: Jul. 10, 2017

(87) PCT Pub. No.: WO2016/185521
PCT Pub. Date: Nov. 24, 2016

(65) Prior Publication Data
US 2018/0264530 A1 Sep. 20, 2018

(51) Int. Cl.
*B21C 23/21* (2006.01)
*B21C 31/00* (2006.01)
*F01L 3/14* (2006.01)
*F01L 3/24* (2006.01)
*B23P 15/00* (2006.01)

(52) U.S. Cl.
CPC .......... *B21C 23/215* (2013.01); *B21C 23/211* (2013.01); *B21C 31/00* (2013.01); *F01L 3/14* (2013.01); *F01L 3/24* (2013.01); *B23P 15/002* (2013.01); *F01L 2103/01* (2013.01)

(58) Field of Classification Search
CPC ..... B21C 23/215; B21C 23/00; B21C 23/211; B21C 31/00
See application file for complete search history.

(56) References Cited

FOREIGN PATENT DOCUMENTS

| JP | 03-018605 A | 1/1991 |
| JP | 04-232318 A | 8/1992 |
| JP | 4-272413 A | 9/1992 |
| JP | 2012-136979 A | 7/2012 |

OTHER PUBLICATIONS

Written Opinion of the International Searching Authority issued in the corresponding Application No. PCT/JP2015/064060 dated Aug. 4, 2015.

*Primary Examiner* — Teresa M Ekiert
(74) *Attorney, Agent, or Firm* — Roberts Mlotkowski Safran Cole & Calderon, P.C.

(57) ABSTRACT

Each time a highly-viscous substance is extruded, a variation in weight of each cut piece of the highly-viscous substance is minimized. Metallic sodium (5) loaded in an extruder main body (3) is extruded from a nozzle (7) of the extruder main body (3) with a pressing tool (4) and, when it is detected that the metallic sodium (5) is extruded to a predetermined position, the movement of the pressing tool (4) is stopped and the extruded metallic sodium (5) is cut. In this case, an impulse (P) after stop is brought closer to a constant value until a load no longer acts on the metallic sodium (5) in the extruder main body (3) after stopping the movement of the pressing tool (4) by adjusting the movement speed of the pressing tool (4).

16 Claims, 9 Drawing Sheets

HIGHLY-VISCOUS SUBSTANCE DISPENSING METHOD AND HIGHLY-VISCOUS SUBSTANCE DISPENSING APPARATUS

TECHNICAL FIELD

The present invention relates to a highly-viscous substance dispensing method and a highly-viscous substance dispensing apparatus.

BACKGROUND ART

In various industrial fields, an extruder extruding a highly-viscous substance is used. Generally, the extruder is loaded with a highly-viscous substance in an extruder main body and extrudes the highly-viscous substance in the extruder main body with a pressing tool from a nozzle of the extruder main body, and the extruded highly-viscous substance is incorporated in an incorporating object. For example, Patent Document 1 (FIG. 2) discloses details of loading metallic sodium into an extruder main body and extruding the metallic sodium with a pressing tool from a nozzle of the extruder main body to the outside so as to fill metallic sodium, i.e., a highly-viscous substance, as a cooling medium into a hollow engine valve used as an incorporating object.

The extruders are recently increasingly automated and, when it is detected that a highly-viscous substance is extruded from an extruder (extruder main body) to a predetermined position, the movement of the pressing tool in the extruder is stopped and the extruded highly-viscous substance is cut by a cutting tool. As a result, a highly-viscous substance to be incorporated into one incorporating object is easily acquired.

PRIOR ART DOCUMENT

Patent Document

Patent Document 1: Japanese Laid-Open Patent Publication No. 3-18605

SUMMARY OF THE INVENTION

Problem to be Solved by the Invention

However, the extruder has a residual pressure remaining in the extruder main body even after stopping the movement of the pressing tool and, even if a highly-viscous substance is cut when it is detected that the highly-viscous substance is extruded to a predetermined position, the highly-viscous substance is extruded in a period before the cutting. Moreover, the length of the highly-viscous substance extruded after stopping the movement of the pressing tool is not necessarily constant, and variations occur in weight of the cut highly-viscous substance. Therefore, variations occur in the filling weight of the highly-viscous substance incorporated in the incorporating objects.

As a result of extensive studies on such a phenomenon, the present inventor has found that the variation weight of the highly-viscous substance and the variation in weight of the highly-viscous substance are affected by a difference in movement speed before stopping the movement of the pressing tool and a change in highly-viscous substance mass in the extruder main body, and has acquired the knowledge that the variation weight of the highly-viscous substance and the variation in weight of the highly-viscous substance are ultimately significantly dominated by a difference in change of momentum of the highly-viscous substance, i.e., a difference in impulse with respect to the highly-viscous substance in the extruder main body, after stopping the movement of the pressing tool.

The present invention was conceived based on such knowledge and a first object thereof is to provide a highly-viscous substance dispensing method capable of minimizing a variation in weight of each cut piece of a highly-viscous substance each time the highly-viscous substance is extruded.

A second objective is to provide a highly-viscous substance dispensing apparatus capable of minimizing a variation in weight of each cut piece of a highly-viscous substance each time the highly-viscous substance is extruded.

Means for Solving Problem

To achieve the first object, the present invention (a first aspect of invention) is configured as a highly-viscous substance dispensing method including extruding a highly-viscous substance loaded in an extruder main body from a nozzle of the extruder main body with a pressing tool moving in the extruder main body, and cutting the extruded highly-viscous substance after stopping the movement of the pressing tool when it is detected that the highly-viscous substance is extruded to a predetermined position, wherein an impulse after pressing-tool movement stop with respect to the highly viscous substance is brought closer to a constant value until a load no longer acts on the highly-viscous substance in the extruder main body after stopping the movement of the pressing tool by adjusting the movement speed of the pressing tool.

With this configuration, based on the present inventor's knowledge (that if the impulse after pressing-tool movement stop can be made constant, the weight of cut pieces of the highly-viscous substance becomes constant), even if the highly-viscous substance is extruded after stopping the movement of the pressing tool each time the highly-viscous substance is extruded from the extruder main body, the extrusion amount of the highly-viscous substance can be made substantially constant.

The following forms can be taken as preferable configuration forms of the present invention (the first aspect of invention) on the premise of the configuration of the present invention (the first aspect of invention).

(1) In a configuration that can be achieved, a target impulse after pressing-tool movement stop is set as the constant value, and the movement speed adjustment of the pressing tool is performed by changing a next movement speed of the pressing tool such that the impulse after pressing-tool movement stop comes closer to the target impulse after pressing-tool movement stop.

In this case, by utilizing the inventor's knowledge that the movement speed before stopping the movement of the pressing tool affects the impulse after pressing-tool movement stop with respect to the highly-viscous substance after stopping the movement of the pressing tool for feedback control, the impulse after pressing-tool movement stop with respect to the highly-viscous substance can precisely be brought closer to the target impulse after pressing-tool movement stop (constant value) in each extrusion, and the variation in weight of the highly-viscous substance cut in each extrusion can specifically be suppressed.

(2) In a configuration that can be achieved, the next movement speed of the pressing tool is changed such that when the impulse after pressing-tool movement stop is larger than the target impulse after pressing-tool movement stop, the next movement speed of the pressing tool is made lower than a current movement speed of the pressing tool and that when the impulse after pressing-tool movement stop is smaller than the target impulse after pressing-tool movement stop, the next movement speed of the pressing tool is made higher than the current movement speed of the pressing tool.

In this case, the relationship between the movement speed of the pressing tool and the impulse after pressing-tool movement stop can precisely be reflected in the feedback control, and the impulse after pressing-tool movement stop can specifically be brought close to a constant value. Accordingly, the variation in weight of the highly-viscous substance cut in each extrusion can specifically be suppressed.

(3) In a configuration that can be achieved, the movement speed adjustment of the pressing tool is performed by selecting as the movement speed of the pressing tool a movement speed at which the impulse after pressing-tool movement stop associated with a mass change of the highly-viscous substance in the extruder main body falls within a predetermined allowable range.

In this case, by utilizing the inventor's knowledge that when the movement speed before stopping the movement of the pressing tool is lower, the impulse after pressing-tool movement stop is less changed regardless of a mass change of the highly-viscous substance in the extruder main body, the impulse after pressing-tool movement stop with respect to the highly-viscous substance can be brought closer to a constant value in each extrusion by simply selecting the movement speed as the movement speed of the pressing tool. Therefore, the variation in weight of the cut highly-viscous substance can specifically be suppressed in each extrusion without providing special control.

Moreover, since the movement speed belongs to the low speed side, the impulse after pressing-tool movement stop can be made smaller, so that the variation weight itself of the highly-viscous substance can be made smaller.

(4) In a configuration that can be achieved, the highly-viscous substance is extruded with the pressing tool sequentially through a plurality of stages of movement speed mode ranges, the impulse after pressing-tool movement stop is brought closer to a constant value by adjusting the movement speed in the movement speed mode range of a final stage out of the plurality of stages of movement speed mode ranges, and the movement speed in the movement speed mode range of a preceding stage before the movement speed mode range of the final stage is made faster than the movement speed in the movement speed mode range of the final stage.

In this case, by utilizing the present inventor's knowledge (that the pressing-tool movement speed in the movement speed mode range of the final stage affects the impulse after pressing-tool movement stop with respect to the highly-viscous substance after stopping the movement of the pressing tool), the impulse after pressing-tool movement stop is brought closer to a constant value by adjusting the movement speed in the movement speed mode range of the final stage, and therefore, even if the highly-viscous substance is extruded after stopping the movement of the pressing tool each time the highly-viscous substance is extruded from the extruder main body, the extrusion amount of the highly-viscous substance can be made substantially constant.

On the other hand, since the highly-viscous substance is extruded sequentially through a plurality of stages of movement speed mode ranges, and the movement speed in the movement speed mode range of a preceding stage before the movement speed mode range of the final stage out of the plurality of the movement speed mode ranges is made faster than the movement speed in the movement speed mode range of the final stage, the process time can be reduced as compared to the case of performing the whole of the extrusion operation at the movement speed in the movement speed mode range of the final stage for extruding the highly-viscous substance to a predetermined position.

Therefore, the cycle time (the time required for each extrusion) can be reduced while suppressing a variation in weight of the highly-viscous substance cut in each extrusion.

(5) In a configuration that can be achieved, a target impulse after pressing-tool movement stop is set as the constant value, and the movement speed adjustment of the pressing tool in the final stage is performed by changing a next pressing-tool movement speed in the final stage such that the impulse after pressing-tool movement stop comes closer to the target impulse after pressing-tool movement stop.

In this case, by utilizing the inventor's knowledge (that the impulse after pressing-tool movement stop with respect to the highly-viscous substance is most affected by the movement speed in the movement speed mode range of the final stage) in the feedback control in the movement speed mode range of the final stage, the impulse after pressing-tool movement stop with respect to the highly-viscous substance can precisely be brought closer to the target impulse after pressing-tool movement stop (constant value) in each extrusion. Therefore, the variation in weight of the highly-viscous substance cut in each extrusion can specifically be suppressed.

(6) In a configuration that can be achieved, the movement speed adjustment of the pressing tool in the final stage is performed by selecting as the movement speed of the pressing tool a movement speed at which the impulse after pressing-tool movement stop associated with a mass change of the highly-viscous substance in the extruder main body falls within a predetermined allowable range.

In this case, by utilizing the inventor's knowledge (that when the movement speed before stopping the movement of the pressing tool is lower, the impulse after pressing-tool movement stop is less changed regardless of a mass change of the highly-viscous substance in the extruder main body), the impulse after pressing-tool movement stop with respect to the highly-viscous substance can be brought closer to a constant value in each extrusion by simply selecting the movement speed as the movement speed of the pressing tool in the final stage, so that the variation in weight of the cut highly-viscous substance can specifically be suppressed in each extrusion without providing special control. On the other hand, even if the process time is extended by the pressing-tool movement speed in the final stage, the extension can be canceled by a reduction in the process time based on the movement speed in the movement speed mode range of the preceding stage before the final stage. Therefore, while suppressing an increase in the cycle time, the variation in weight of the highly-viscous substance cut in each extrusion can be suppressed without providing special control.

Moreover, since the movement speed in the final stage belongs to the low speed side, the impulse after pressing-tool movement stop can be made smaller, so that the variation weight itself of the highly-viscous substance can be made smaller.

(7) In a configuration that can be achieved, the highly-viscous substance is a clay-like substance.

In this case, even if the highly-viscous substance is a clay-like substance, the present invention can precisely be applied.

To achieve the second object, the present invention (a second aspect of invention) is configured as a highly-viscous substance dispensing apparatus extruding a highly-viscous substance loaded in an extruder main body from a nozzle of the extruder main body with a pressing tool moving in the extruder main body, and cutting the extruded highly-viscous substance after stopping the movement of the pressing tool when it is detected that the highly-viscous substance is extruded to a predetermined position, the apparatus comprising:

a pressing-tool drive adjusting means driving and adjusting a pressing-tool driving means moving the pressing tool;

a cutting-tool drive adjusting means driving and adjusting a cutting-tool driving means driving the cutting tool;

a highly-viscous substance detecting means detecting that the highly-viscous substance extruded from the nozzle of the extruder reaches a predetermined position;

a setting means setting a movement speed of the pressing tool;

a control executing means moving the pressing tool by adjusting the pressing-tool drive adjusting means based on information from the setting means, the control executing means controlling the pressing-tool drive adjusting means to stop the movement of the pressing tool and controlling the cutting-tool drive adjusting means to cut the highly-viscous substance when determining that the highly-viscous substance extruded from the nozzle of the extruder reaches the predetermined position based on information from the highly-viscous substance detecting means; and a movement speed adjusting means bringing an impulse after pressing-tool movement stop with respect to the highly viscous substance closer to a constant value until a load no longer acts on the highly-viscous substance in the extruder main body after stopping the movement of the pressing tool by adjusting the movement speed of the pressing tool.

The following forms can be taken as preferable configuration forms of the present invention (the second aspect of invention) on the premise of the configuration of the present invention (the second aspect of invention).

(1) In a configuration that can be achieved, the setting means sets a target impulse after pressing-tool movement stop, and the movement speed adjusting means includes an impulse-related information detecting means detecting information related to the impulse after pressing-tool movement stop, and a changing means deriving the impulse after pressing-tool movement stop based on information from the impulse-related information detecting means and changing the movement speed of the pressing tool set by the setting means such that the impulse after pressing-tool movement stop comes closer to the target impulse after pressing-tool movement stop set by the setting means.

(2) In a configuration that can be achieved, the changing means is set such that when the impulse after pressing-tool movement stop detected by the impulse-related information detecting means is higher than the target impulse after pressing-tool movement stop, a next movement speed of the pressing tool is made lower than a current movement speed of the pressing tool and that when the impulse after pressing-tool movement stop is lower than the target impulse after pressing-tool movement stop, the next movement speed of the pressing tool is made higher than the current movement speed of the pressing tool.

(3) In a configuration that can be achieved, the setting means sets the movement speed of the pressing tool as the movement speed adjusting means such that the impulse after pressing-tool movement stop associated with a mass change of the highly-viscous substance in the extruder main body falls within a predetermined allowable range.

(4) In a configuration that can be achieved, the setting unit sets that the highly-viscous substance is extruded with the pressing tool sequentially through a plurality of stages of movement speed mode ranges, sets respective movement speeds in the movement speed mode ranges, and sets that the movement speed in the movement speed mode range of a preceding stage before a final stage out of the plurality of stages of movement speed mode ranges is faster than the movement speed in the movement speed mode range of the final stage, and the movement speed adjusting means is set to bring the impulse after pressing-tool movement stop closer to a constant value by adjusting the movement speed in the movement speed mode range of the final stage.

(5) In a configuration that can be achieved, the setting means sets a target impulse after pressing-tool movement stop, the movement speed adjusting means includes an impulse-related information detecting means detecting information related to the impulse after pressing-tool movement stop, and a changing means deriving the impulse after pressing-tool movement stop based on information from the impulse-related information detecting means and changing the movement speed in the movement speed mode range of the final stage set by the setting means such that the impulse after pressing-tool movement stop comes closer to the target impulse after pressing-tool movement stop set by the setting means.

(6) In a configuration that can be achieved, the setting means sets the movement speed in the movement speed mode range of the final stage as the movement speed adjusting means such that the impulse after pressing-tool movement stop associated with a mass change of the highly-viscous substance in the extruder main body falls within a predetermined allowable range.

(7) In a configuration that can be achieved, the highly-viscous substance is a clay-like substance.

In this case, the second aspect of invention and the preferable forms (1) to (7) of the second aspect of invention provide the same respective operations as those of the first aspect of invention and the preferable forms (1) to (7) of the first aspect of invention described above.

Effect of the Invention

From the above, according to the present invention, since the extrusion amount of the highly-viscous substance can be made substantially constant even if the highly-viscous substance is extruded after stopping the movement of the pressing tool each time the highly-viscous substance is extruded from the extruder main body, variations in weight of cut pieces of the highly-viscous substance can be minimized.

MODES FOR CARRYING OUT THE INVENTION

Embodiments of the present invention will now be described with reference to the drawings.

1. First, description will be made of a basic dispensing method of a highly-viscous substance and a dispensing basic apparatus using the method as a premise of the present invention.

Figure 1:
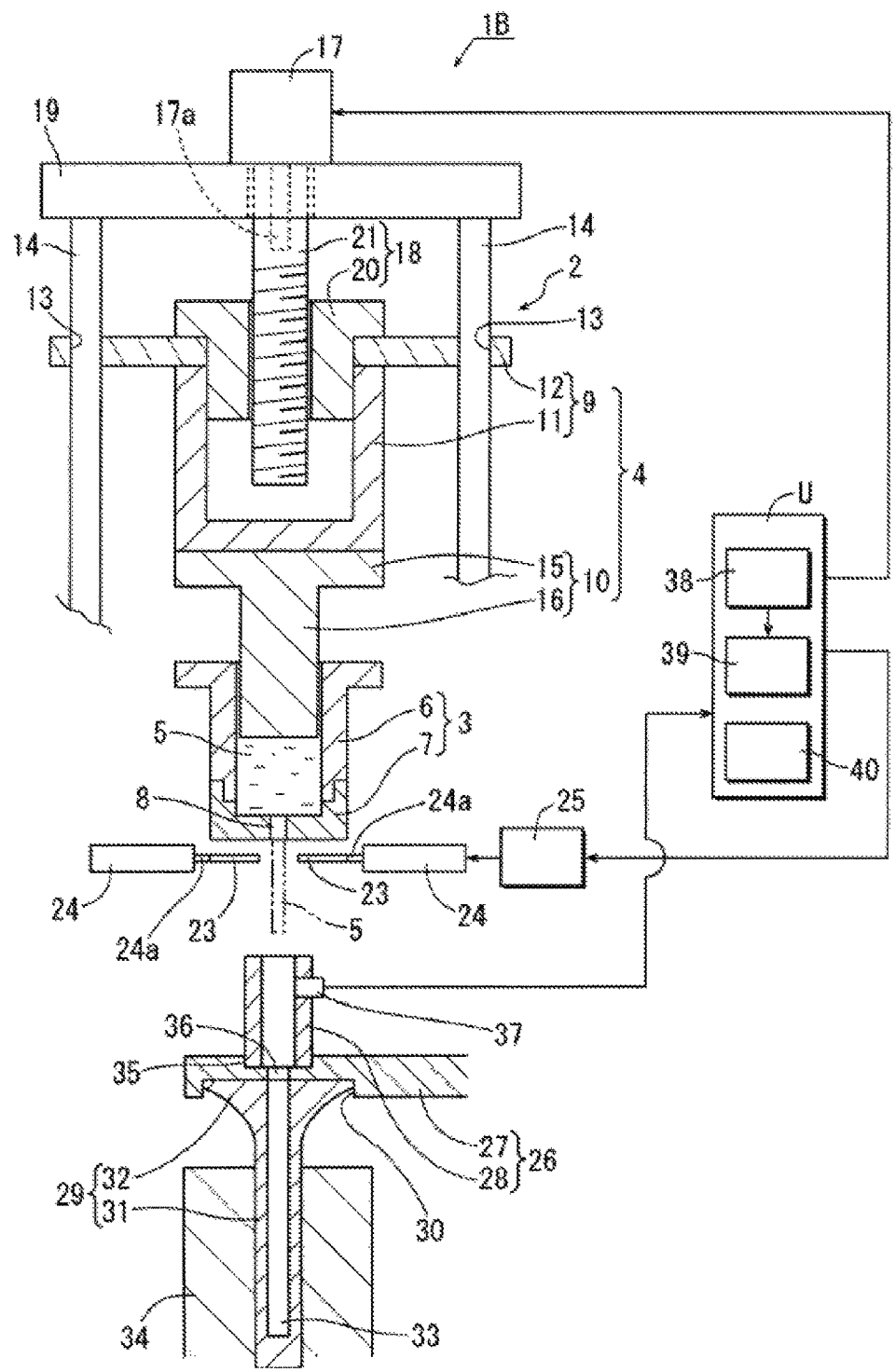
FIG. 1 is an explanatory diagram of a highly-viscous substance dispensing basic apparatus.

(1) Highly-Viscous Substance Dispensing Basic Apparatus (1-1) As shown in FIG. 1, a dispensing basic apparatus 1B includes an extruder 2 having an extruder main body 3 and a pressing tool 4.

(1-1-1) The extruder main body 3 stores clay-like metallic sodium 5 (clay-like substance) as a highly-viscous substance, and the extruder main body 3 includes a cylindrical storage container 6 and a nozzle 7 provided on one end side of the storage container 6 to close an opening on the one end side. The cylindrical storage container 6 is attached to a frame body (attaching frame) not shown with the axis thereof facing in the up-down direction, and the nozzle 7 is disposed on the lower side than the storage container 6 and the nozzle 7 has a squeezing hole 8 formed for linearly extruding the metallic sodium 5.

(1-1-2) The pressing tool 4 includes a main body part 9 and a punch part 10.

The main body part 9 is disposed above the storage container 6 and below a support plate 19 attached to the frame body (attaching frame) not shown. The main body part 9 includes a cylindrical part 11 having a bottomed cylindrical shape and an expanded part 12 expanded radially outward from an opening portion of the cylindrical part 11, and the expanded part 12 has a pair of guide holes 13 formed on both sides thereof relative to the axis of the cylindrical part 11. The main body part 9 is disposed with the opening side facing upward, and guide bars 14 attached to the support plate 19 and extending in the up-down direction are slidably inserted through the guide holes 13. As a result, the main body part 9 is displaceable in the up-down direction in a region above the extruder main body 3.

The punch part 10 is attached to an external lower surface (the cylindrical part 11) of the main body part 9. The punch part 10 includes a basal plate part 15 corresponding to the external lower surface of the main body part 9 and a pressing part 16 protruding with a constant diameter from the basal plate part 15, and the basal plate part 15 is attached to the external lower surface of the main body part 9, while the pressing part 16 is disposed in a region above an opening of the other end of the storage container 6 so as to be able to slidably enter the inside of the storage container 6. As a result, when the body part 9 is guided by the guide holes 13 and the guide bars 14 and the pressing part 16 (the punch part 10) enters the storage container 6, the metallic sodium 5 in the extruder main body 3 (see imaginary line of FIG. 1) is linearly extruded through the nozzle 7 to the outside.

(1-2) As shown in FIG. 1, the dispensing basic apparatus 1B includes a servomotor 17 as a pressing-tool driving means (and a pressing-tool drive adjusting means) applying a drive force to the pressing tool 4, and a transmission mechanism 18 transmitting the driving force of the servomotor 17 to the pressing tool 4.

(1-2-1) The servomotor 17 is disposed above the pressing tool 4 with an output shaft 17a thereof facing downward. In this embodiment, the servomotor 17 is fixed to an upper surface of the support plate 19, and the output shaft 17a of the servomotor 17 penetrates the support plate 19 and extends downward.

(1-2-2) In this embodiment, a ball screw mechanism 18 (denoted by the same reference numeral as the transmission mechanism) is used for the transmission mechanism 18. The ball screw mechanism 18 includes a nut 20 and a screw shaft 21, and the nut 20 is relatively non-rotatably fitted to and held (integrated) with an opening portion of the main body part 9 of the pressing tool 4, and the screw shaft 21 has one end portion coupled to the output shaft 17a of the servomotor 17 and the other end portion screwed to the nut 20. As a result, when the servomotor 17 is driven, the pressing tool 4 moves up and down, and the punch part 10 accordingly advances and retracts in the extruder main body 3.

(1-3) As shown in FIG. 1, the dispensing basic apparatus 1B includes a cutting tool 23, an air cylinder 24 as a cutting-tool driving means driving the cutting tool 23, and an air cylinder drive adjustment mechanism 25 as a cutting-tool drive adjusting means adjusting the drive of the air cylinder 24.

(1-3-1) The cutting tool 23 is disposed directly under the extruder main body 3 for the purpose of cutting the clay-like metallic sodium 5 linearly extruded from the nozzle 7. In this embodiment, a pair of the cutting tools 23 is provided, and the paired cutting tools 23 are disposed in a state of facing each other on both sides relative to the nozzle 7.

(1-3-2) The air cylinder 24 has an extensible rod 24a coupled to the cutting tool 23 for the purpose of driving the cutting tool 23. In this embodiment, since a pair of the cutting tools 23 is provided, a pair of the air cylinders 24 is prepared, and the extensible rods 24a of the air cylinders 24 are respectively coupled to the cutting tools 23. The air cylinders 24 cause the pair of the cutting tools 23 to perform approaching/separating movement and, when the pair of the cutting tools 23 performs the approaching movement, the clay-like metallic sodium 5 extruded from the nozzle 7 is cut.

The pair of the air cylinders 24 is attached to the frame body not shown.

(1-3-3) The air cylinder drive adjustment mechanism. 25 is included for each of the air cylinders 24 (the air cylinder drive adjustment mechanism 25 of one of the air cylinders 24 is not shown). Each of the air cylinder drive adjustment mechanisms 25 is made up of an electromagnetic valve mechanism etc. adjusting supply/discharge of compressed air from a compressed air source not shown, and the approaching/separating movement of the pair of the cutting tools 23 described above is achieved by adjusting the mechanism.

(1-4) As shown in FIG. 1, the dispensing basic apparatus 1B includes a receiving mechanism 26 receiving the cut metallic sodium 5. This receiving mechanism 26 integrally includes a support plate 27 and a guide cylinder 28 disposed on the support plate 27.

(1-4-1) The support plate 27 is fixed to the frame body not shown under the extruder main body 3 such that the plate surfaces of the support plate 27 face upward and downward. On the lower surface of the support plate 27, a positioning recess 30 having a circular shape in planar view is formed for a poppet valve workpiece 29, and the axis of the positioning recess 30 is made coincident with the axis of the nozzle 7. The poppet valve workpiece 29 has a stem 31 and a head (diameter expansion part) 32 provided with an expanded diameter at one end portion of the stem 31, and an internal space 33 extending from a leading end surface of the head 32 to the stem 31 is formed in the poppet valve workpiece 29 so as to fill the cut metallic sodium 5 described above. The positioning recess 30 is for receiving and positioning the head 32 of the poppet valve workpiece 29 and, when the head 32 of the poppet valve workpiece 29 is fitted into the positioning recess 30, the axis of the internal space 33 of the poppet valve workpiece 29 also coincides with the axis of the nozzle 7. To sequentially fit the heads 32 of the poppet valve workpieces 29 into the positioning recess 30, a conveying apparatus 34 is prepared in this embodiment. The conveying apparatus 34 is raised with the stem 31 of the poppet valve workpiece 29 fitted and held, and the head 32 of the poppet valve workpiece 29 is thereby fitted into the positioning recess 30.

A holding hole 35 for holding the guide cylinder 28 is formed on the upper surface of the support plate 27. The holding hole 35 is disposed such that the axis thereof coincides with the axis of the positioning recess 30 and the axis of the nozzle 7.

The support plate 27 has a conduction hole 36 formed between a bottom portion of the positioning recess 30 and a bottom portion of the holding hole 35. The conduction hole 36 guides the metallic sodium 5 extruded and cut from the nozzle 7 side to the positioning recess 30 and, therefore, the axis of the conduction hole 36 is also arranged to be coincident with the axis of the nozzle 7, the axis of the positioning recess 30, and the axis of the internal space 33 of the poppet valve workpiece 29.

(1-4-2) The guide cylinder 28 has one end portion fitted and held in the holding hole 35. Therefore, the axis of the guide cylinder 28 also coincides with the axis of the nozzle 7, the axis of the conduction hole 36, and the axis of the internal space 33 of the poppet valve workpiece 29, and the guide cylinder 28 plays a role of guiding the metallic sodium 5 extruded and cut from the nozzle 7 into the internal space 33 in the poppet valve workpiece 29.

A metallic sodium detection sensor 37 acting as a highly-viscous substance detecting means is provided in an upper end portion of the guide cylinder 28. When the metallic sodium 5 hanging down from the nozzle 7 blocks the front of the metallic sodium detection sensor 37, the metallic sodium detection sensor 37 detects the arrival and outputs a metallic sodium detection signal, and a light emitting element and a light receiving element (including a reflection type) can be used for the metallic sodium detection sensor 37. As a result, it is determined that the metallic sodium 5 hanging from the nozzle 7 reaches a predetermined position (attains a predetermined length). Therefore, from the relationship with the weight (length) of the metallic sodium 5 to be filled into the internal space 33 in the poppet valve workpiece 29, the metallic sodium detection sensor 37 is disposed in a location at a predetermined position from the nozzle 7.

(1-5) As shown in FIG. 1, the dispensing basic apparatus 1B includes a control unit U as a control means so as to control the servomotor 17 and the air cylinder drive adjustment mechanism 25.

(1-5-1) Therefore, the metallic sodium detection signal from the metallic sodium detection sensor 37 is input to the control unit U, and a control signal (output signal) is output from the control unit U to the servomotor 17 and the air cylinder drive adjustment mechanism 25.

(1-5-2) The control unit U includes a setting part (setting means) 38 for setting a setting value such as a movement speed of the pressing tool 4 and a control executing part (control executing means) 39 outputting a control signal so as to execute the setting value of the setting part 38.

It is noted that reference numeral 40 denotes a storage part, and the storage part 40 stores setting information etc. of a calculation program etc. necessary for execution of control, and the program etc. are read by control parts, processing parts, etc. as needed. Additionally, necessary information is stored as appropriate.

(2) Highly-Viscous Substance Basic Dispensing Method (2-1) A highly-viscous substance basic dispensing method is used in the highly-viscous substance dispensing basic apparatus 1B. This highly-viscous substance basic dispensing method will be described together with details of the control of the control unit U.

When an instruction for movement of the pressing tool 4 at a predetermined movement speed v is given to the servomotor 17 based on the control signal from the control unit U, the pressing tool 4 descends to press the metallic sodium 5 in the extruder main body 3 downward. As a result, the clay-like metallic sodium 5 is linearly extruded downward through the nozzle 7. In this case, the pressing tool 4 presses the metallic sodium used as a highly-viscous substance and therefore reaches a predetermined movement speed range (with a slight rising tendency) through a start-up range and an adjustment range (see FIG. 3).

When the leading end of the metallic sodium 5 enters the guide cylinder 28 and the leading end reaches the front of the metallic sodium detection sensor 37, the metallic sodium detection sensor 37 determines that the metallic sodium 5 has reached a predetermined length from the nozzle 7 (has reached a predetermined weight), and outputs the metallic sodium detection signal to the control unit U. When receiving this metallic sodium detection signal, the control unit U outputs a stop signal to the servomotor 17 and outputs an actuation signal to the air cylinder drive adjustment mechanism 25. As a result, the movement of the pressing tool 4 is stopped so that the operation of extruding the metallic sodium 5 by the pressing tool 4 is stopped, and the pair of the cutting tools 23 is driven to cut the metallic sodium 5 continuously extending from the nozzle 7. Based on its own weight, the cut metallic sodium 5 passes through the guide cylinder 28 and the conduction hole 36 and is filled into the internal space 33 of the poppet valve workpiece 29 currently set in the positioning recess 30. When the metallic sodium is filled into the internal space 33 of the poppet valve workpiece 29, the poppet valve workpiece 29 is carried out by the conveying apparatus 34, and such a filling operation is repeated for the next new poppet valve workpiece 29.

Figure 2:
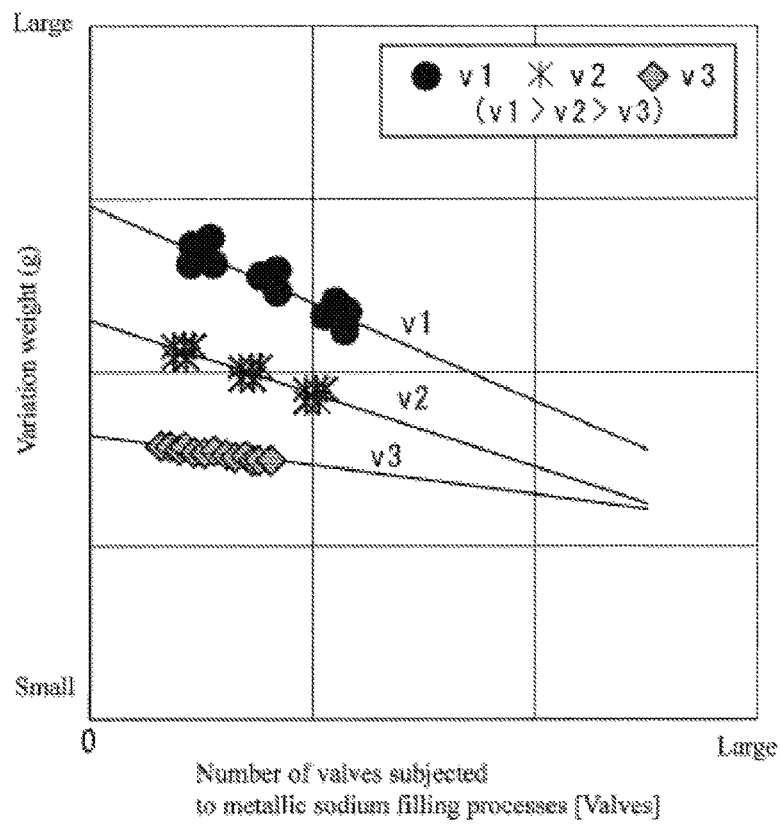
FIG. 2 is a characteristic diagram in the case of using the highly-viscous substance dispensing basic apparatus, showing how the weight of the cut-out highly-viscous substance changed depending on a movement speed of a pressing tool and the mass of the highly-viscous substance in an extruder main body (the number of valves subjected to valve filling processes).

2. Knowledge Acquired by the Present Inventor (1) It was found that in the filling operations, variations (increased/decreased states relative to a standard weight) occurs in weight (filling weight) of cut pieces of the metallic sodium 5. FIG. 2 shows a state of variation in weight of cut pieces of the metallic sodium 5 and, as specific contents thereof, shows how the variation in weight of the cut metallic sodium 5 is affected by a plurality of movement speeds v1, v2, v3 of the pressing tools 4 and shows how the variation in weight of the cut metallic sodium 5 are affected by a residual mass of the metallic sodium 5 in the extruder main body 3 at each movement speed v1 (v2, v3) of the pressing tool 4.

(2) According to FIG. 2, it is shown that the variation in weight of the cut metallic sodium 5 is affected by the movement speed v of the pressing tool 4, and that a variation weight (a weight varying from a reference value) becomes larger when the pressing-tool movement speed v is faster (v1>v2>v3).

It is also shown that the variation in weight of the cut metallic sodium 5 is affected by a residual mass of the metallic sodium 5 in the extruder main body 3 at any of the movement speeds v1, v2, v3 of the pressing tool 4, and that the weight of the cut metallic sodium 5 changes in accordance with a change in residual mass of the metallic sodium in the extruder main body 3.

However, with regard to a low movement speed v of the pressing tool 4, it is shown that a change in weight of the cut metallic sodium 5 becomes smaller at a lower movement speed v (e.g., v3) even if the residual mass of the metallic sodium in the extruder main body 3 changes, and that a change in variation weight falls within an allowable range depending on a movement speed v of the pressing tool 4 (see a characteristic line of v3 of FIG. 2).

In FIG. 2, the "number of valves subjected to metallic sodium filling processes" means the number of valves subjected to processes of filling the cut metallic sodium 5 into the internal spaces 33 in the poppet valve workpieces 29 and, as this "number of valves subjected to metallic sodium filling processes" becomes larger, the residual mass of the metallic sodium in the extruder main body 3 decreases, so that a larger "number of valves subjected to metallic sodium filling processes" indicates a smaller residual mass of the metallic sodium in the extruder main body 3.

(3) From the contents of the FIG. 2, the present inventor has found that the variation weight of the cut metallic sodium 5 and the variation in weight of the cut metallic sodium 5 are affected by a difference in the movement speed v (v1, v2, v3) of the pressing tool 4 in the stage (final stage) immediately before stopping the movement and a change in residual mass of the metallic sodium in the extruder main body 3 and, from this finding, the present inventor has acquired the knowledge that while the extrusion of the metallic sodium. 5 naturally somewhat continues due to a residual pressure remaining in the extruder main body after stopping the movement of the pressing tool 4, the variation weight of the metallic sodium 5 and the variation in weight of the metallic sodium 5 based on the extrusion are significantly dominated by a difference in change of momentum of the metallic sodium 5 in the extruder main body 3 after stopping the movement of the pressing tool 4, i.e., a difference in impulse after pressing-tool movement stop (hereinafter referred to as an impulse after movement stop) with respect to the metallic sodium 5 in the extruder main body 3.

Figure 3:
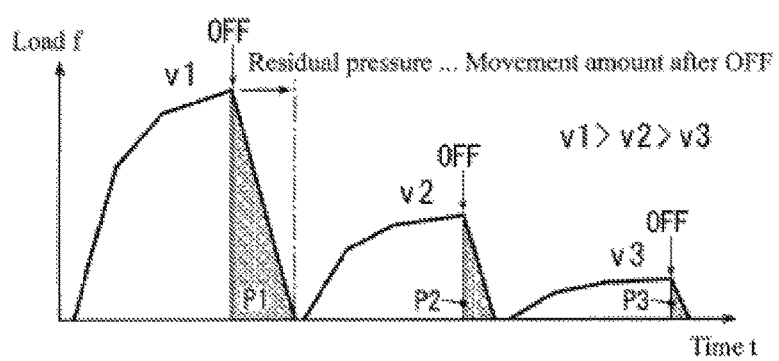
FIG. 3 is a diagram of load f/time t characteristics in the case of using respective pressing-tool movement speeds v1, v2, v3 (v1>v2>v3) in extrusion of the highly-viscous substance.

FIG. 3 shows a change in a load f of the metallic sodium 5 in the extruder main body 3 when the metallic sodium 5 is extruded from within the extruder main body 3 at each of the pressing-tool movement speeds v1, v2, v3. In FIG. 3, respective impulses P1, P2, P3 after movement stop (integrated value of d(ft) before a time t until the action of the load f disappears after stopping the movement of the pressing tool 4) with respect to the metallic sodium 5 in the extruder main body 3 can be indicated by an area (an area of a colored portion) and, also in FIG. 3, it is shown that the impulses P1, P2, P3 after movement stop satisfy P1>P2>P3 in accordance with v1>v2>v3 of the movement speed v of the pressing tool 4, which confirms the knowledge described above (about the variation weight of metallic sodium).

From the above, the present inventor has conceived that, to make the weight of the extruded metallic sodium 5 constant (to suppress variations) each time the metallic sodium 5 is extruded, the impulse after movement stop with respect to the metallic sodium 5 in the extruder main body 3 must be made constant (equal) after stopping the movement of the pressing tool 4, and that, to reduce the variation weight itself of the extruded metallic sodium 5 relative to the standard filling weight, the impulse after movement stop with respect to the metallic sodium 5 in the extruder main body 3 itself must be made smaller.

3. First Embodiment of the Present Invention

As described above, if the impulse after movement stop with respect to the metallic sodium 5 in the extruder main body 3 is made constant, the variation in weight of the cut metallic sodium 5 is suppressed; however, even if only the pressing-tool movement speed v acting as a factor causing a variation in weight of the cut metallic sodium 5 is made constant in each extrusion, the residual mass of the metallic sodium 5 in the extruder main body 3 decreases as the number of times of extrusion increases, and the weight of the cut metallic sodium 5 is accordingly changed.

Therefore, in details described in a first embodiment of the present invention, to achieve the constant (equal) impulse P after movement stop with respect to the metallic sodium 5 in the extruder main body 3 after stopping the movement of the pressing tool 4 each time the metallic sodium 5 is extruded, feedback control is provided for the impulse P after movement stop by utilizing the knowledge described above.

Figure 4:
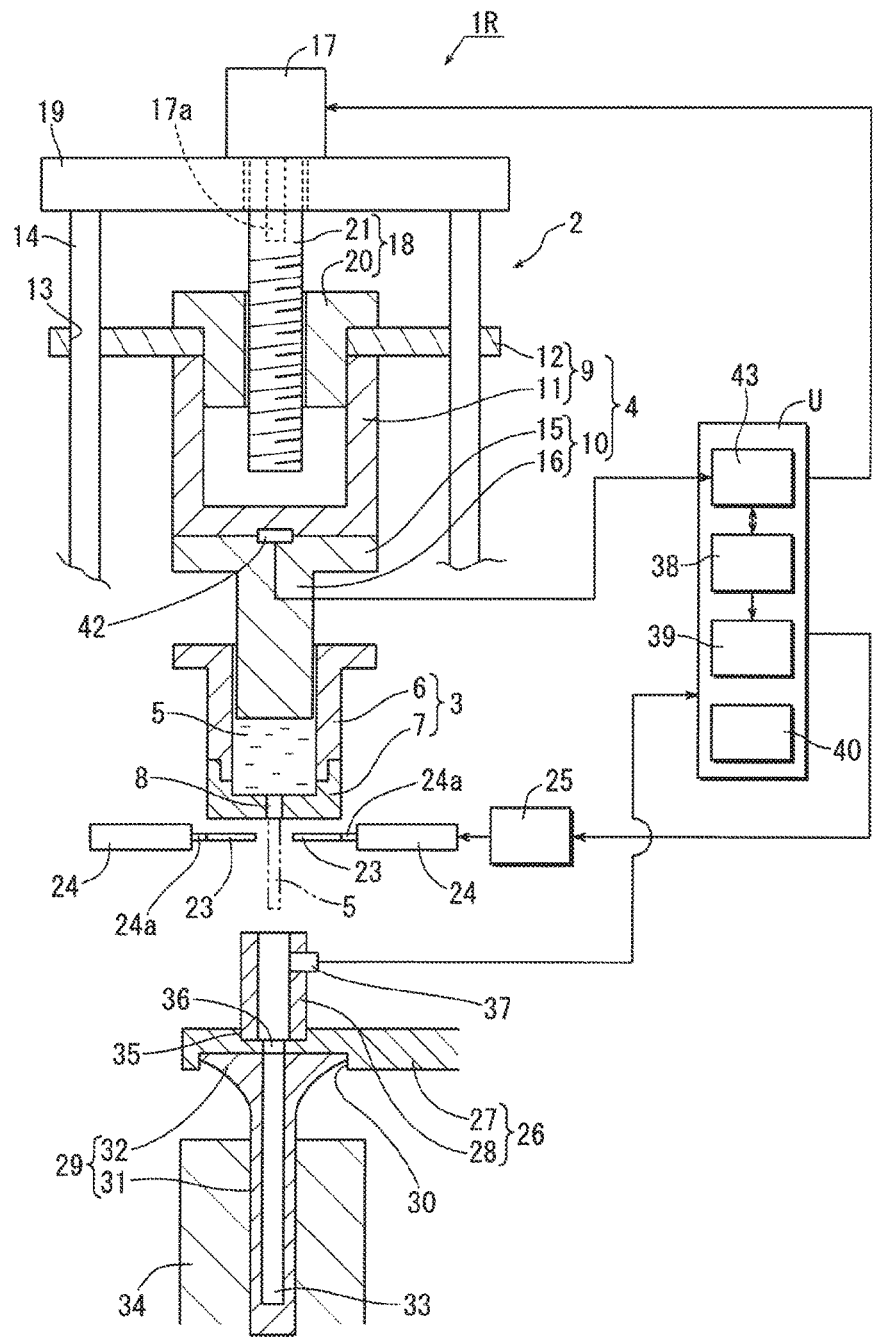
FIG. 4 is an explanatory diagram of a dispensing apparatus according to a first embodiment.

(1) Configuration of Dispensing Apparatus 1R and Dispensing Method According to First Embodiment In the first embodiment, as shown in FIG. 4, a dispensing apparatus 1R is used. This dispensing apparatus 1R is provided with a load sensor (load cell) 42 serving as an impulse-related information detecting means between the main body part 9 and the punch part 10 in addition to the configuration of the dispensing basic apparatus 1B described above (see FIG. 1), and the detection information of the load sensor 42 is input to the control unit U. The load sensor 42 detects a load acting state on the metallic sodium 5 in the extruder main body 3, and the load sensor 42 continuously detects the load acting state on the metallic sodium 5 in the extruder main body 3 even after the movement of the pressing tool 4 is stopped.

Additionally, in the control unit U, a target impulse Ps after pressing-tool movement stop (constant value: see also FIG. 5) is set in the setting part 38, and a changing part 43 is added as a changing means.

Based on the detection information from the load sensor 42, the changing part 43 obtains the impulse P after pressing-tool movement stop with respect to the metallic sodium 5 in the extruder main body 3 (the area of the colored portion of FIG. 3) from an input time point of the metallic sodium detection signal from the metallic sodium detection sensor 37 or an output time point of a drive stop signal to the servomotor 17 (see an OFF signal at the movement speed v of FIG. 3) until the load sensor 42 no longer detects a load, and changes the movement speed v of the pressing tool 4 set by the setting part 38 such that the impulse P after movement stop comes closer to the target impulse Ps after pressing-tool movement stop set by the setting part 38.

Figure 6:
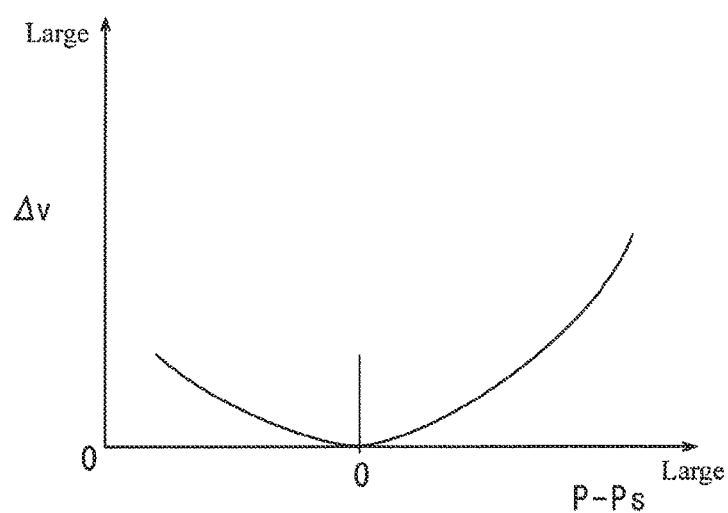
FIG. 6 is a conceptual diagram of a relationship between a correction amount Δv and a difference P−Ps used in feedback control in the first embodiment.

Specifically, when the impulse P after stop is higher than the target impulse Ps after movement stop, the next movement speed v of the pressing tool 4 is set lower than the current movement speed v by a correction amount $\Delta v$ corresponding to a difference P−Ps (see FIG. 6) and, when the impulse P after movement stop is lower than the target impulse Ps after movement stop, the next movement speed v of the pressing tool 4 is set higher than the current movement speed v by the correction amount $\Delta v$ corresponding to the difference P−Ps (see FIG. 6).

Figure 5:
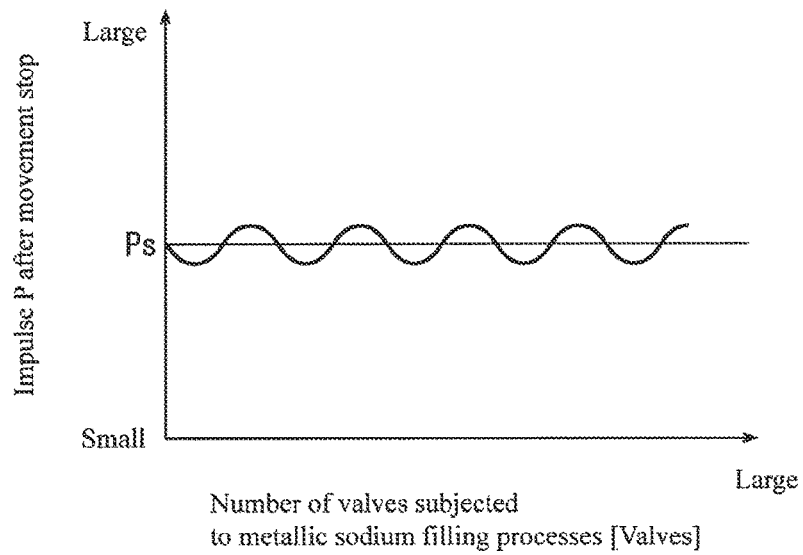
FIG. 5 is an explanatory diagram for explaining a summary of control in the dispensing apparatus according to the first embodiment.

With such a structure, as shown in FIG. 5, the feedback control is provided in the dispensing apparatus 1R to adjust the movement speed v of the pressing tool 4 each time the metallic sodium 5 is extruded so that the impulse P after movement stop comes closer to the target impulse Ps after movement stop, and the impulse P after movement stop becomes a substantially constant value (the target impulse Ps after movement stop). As a result, even if the metallic sodium 5 is extruded after stopping the movement of the pressing tool 4 in each extrusion, the extrusion amount of the metallic sodium 5 can be made substantially constant so that the variations in weight of cut pieces of the metallic sodium 5 can be minimized. Obviously in this case, the constant amount of the metallic sodium 5 is extruded after stopping the movement of the pressing tool 4 and, therefore, to achieve the filling amount of the metallic sodium 5 into the internal space 33 of the poppet valve workpiece 29 as defined in the standard, the metallic sodium detection position (the arrangement position of the metallic sodium detection sensor 37) is determined with consideration given to the constant amount.

Figure 7:
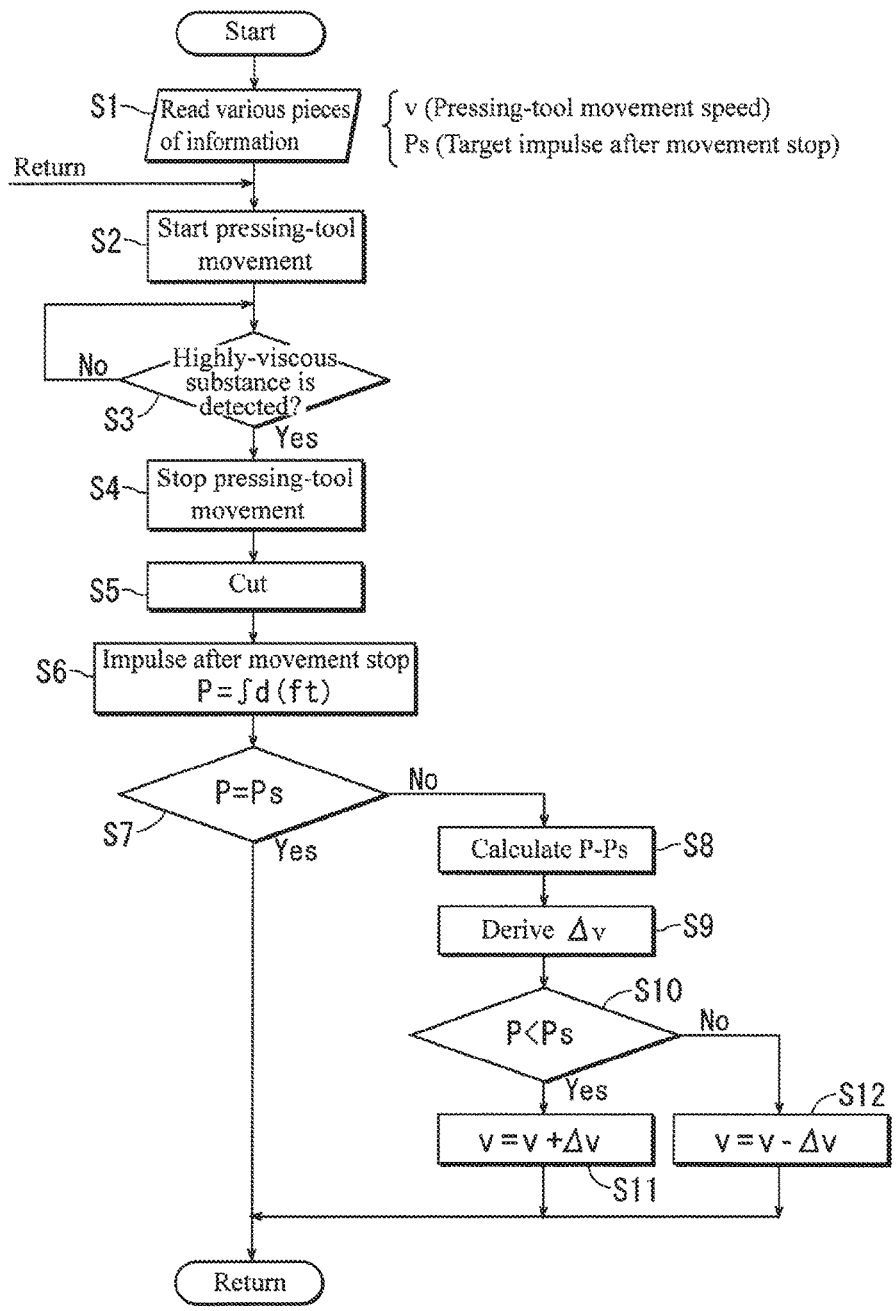
FIG. 7 is a flowchart of a control example of a control unit in the first embodiment.

(2) Example of Control by Control Unit U in Dispensing Apparatus 1R according to First Embodiment An example of control of the dispensing apparatus 1R according to the first embodiment will specifically be described with reference to a flowchart shown in FIG. 7. It is noted that S stands for step.

First, at S1, various pieces of information are read, including the movement speed v of the pressing tool 4, the target impulse Ps after movement stop after stopping the movement of the pressing tool 4, etc.

After the various pieces of information are read, at S2, the pressing tool 4 starts moving so as to move at the movement speed v set by the setting unit 38, and the extrusion of the metallic sodium 5 from the nozzle 7 is started.

At next S3, it is determined whether the metallic sodium 5 used as a highly-viscous substance is detected. This is performed so as to determine whether the metallic sodium 5 is extruded until reaching a predetermined position from the nozzle 7. If S3 is NO, this determination process is repeated and, on the other hand, if S3 is YES, it is determined that the metallic sodium 5 has reached the predetermined position from the nozzle 7, so that the movement of the pressing tool 4 is stopped at S4, and the linearly extruded metallic sodium 5 is cut at S5. When the movement of the pressing tool 4 is stopped (cutting by the cutting tool 23 is performed), the impulse P after movement stop with respect to the metallic sodium 5 in the extruder main body 3 is obtained at S6 based on the information from the load sensor 42, and it is determined at next S7 whether the impulse P after movement stop and the target impulse Ps after movement stop are equal to each other. This is performed so as to determine whether to correct the impulse P after movement stop associated with the variation of the cut metallic sodium 5.

If S7 is YES, a return is made since it is considered that the correction is not required (no variation exists in the weight of the cut metallic sodium 5) and, on the other hand, if S7 is NO, the difference P−Ps of the impulse P after movement stop and the target impulse Ps after movement stop is calculated at step S8, and the correction amount $\Delta v$ of the movement speed v of the pressing tool 4 is derived at next S9 from FIG. 6 based on the difference P−Ps. At next S10, it is determined whether the impulse P after movement stop is smaller than the target impulse Ps after movement stop and, if S10 is YES, it is considered that the impulse P after movement stop needs to be increased and, at S11, the next movement speed v of the pressing tool 4 is changed to the speed acquired by adding the correction amount $\Delta v$ to the current movement speed v at which the extrusion of the metallic sodium 5 is completed. Subsequently, a return is made so as to move the pressing tool 4 at the movement speed v of S11 when the metallic sodium 5 is extruded next time.

On the other hand, if S10 is NO, it is considered that the impulse P after movement stop needs to be reduced and, at S12, the next movement speed v of the pressing tool 4 is changed to the speed acquired by subtracting the correction amount $\Delta v$ from the current movement speed v at which the extrusion of the metallic sodium 5 is completed and, subsequently, a return is made so as to move the pressing tool 4 at the movement speed v of S12 when the metallic sodium 5 is extruded next time.

4. Second Embodiment of the Present Invention

In details described in a second embodiment of the present invention, by utilizing the knowledge that when the movement speedy of the pressing tool 4 is set to a lower speed, not only the variation weight itself of the cut metallic sodium 5 can be made smaller, but also the variation in weight of the cut metallic sodium 5 can be reduced regardless of the residual mass of the metallic sodium 5 in the extruder main body 3, such a speed is selected as the movement speed v of the pressing tool 4.

Figure 8:
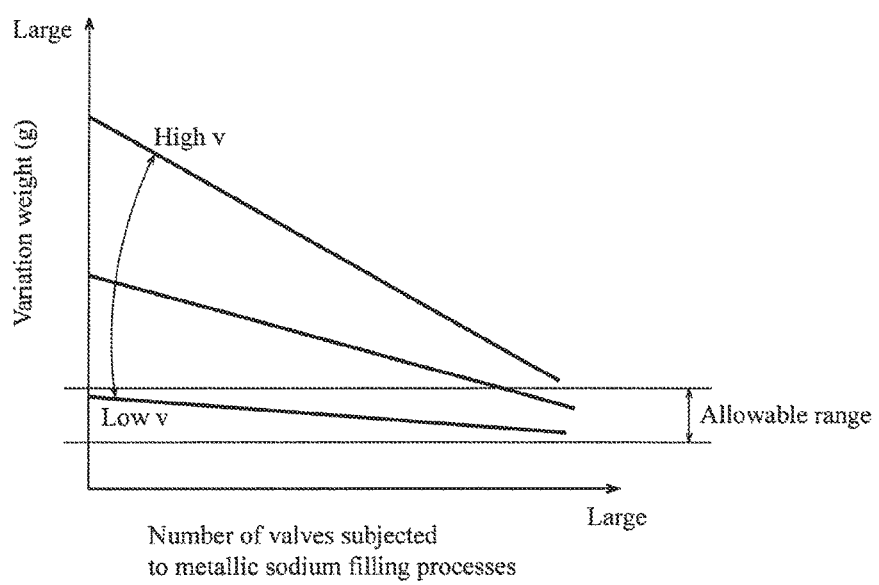
FIG. 8 is an explanatory diagram for explaining a second embodiment.

(1) Configurations Etc. of Dispensing Apparatus 1R and Dispensing Method According to Second Embodiment In the dispensing apparatus 1R according to the second embodiment, the dispensing basic apparatus 1B described above (see FIG. 1) is used and, in the setting unit 38 of the control unit U, as shown in FIG. 8, the movement speed v of the pressing tool 4 is set to a speed at which a change in weight of the cut metallic sodium 5 (the impulse P after movement stop) associated with a mass change of the metallic sodium 5 in the extruder main body 3 falls within a predetermined allowable range (a relatively low movement speed v of the pressing tool 4).

Therefore, by simply selecting the movement speed v of the pressing tool 4 as described above, the impulse P after stop with respect to the metallic sodium 5 can be made smaller and closer to a substantially constant value in each extrusion, so that the variation weight itself of the cut metallic sodium 5 can be made smaller in each extrusion without providing special control and the variation in weight of the metallic sodium 5 can be suppressed.

Thus, in the second embodiment, as described above, it is sufficient to set a low speed as the low movement speed v of the pressing tool 4 in the setting unit 38 of the control unit U, and the load sensor 42 and the change unit 43 of the control unit U in the first embodiment becomes unnecessary. Therefore, the control in the control unit U can also be utilized as before (as described in S1 to S5 of FIG. 7).

5. Third Embodiment of the Present Invention

In details described in a third embodiment of the present invention, by utilizing the knowledge that the movement speed v in the stage (final stage) immediately before stopping the movement of the pressing tool 4 is significantly related, and the movement speed v in a preceding stage before the final stage is not related, to making the impulse P after movement stop with respect to the metallic sodium 5 in the extruder main body 3 constant (equal) after stopping the movement of the pressing tool 4 each time the metallic sodium 5 is extruded, the impulse P after movement stop is made constant (equal) by using the final-stage movement speed v of the pressing tool 4, while the movement speed v of the pressing tool 4 in the preceding stage before the final stage is increased to reduce a cycle time (an extrusion process time of the metallic sodium 5).

(1) Configurations Etc. of Dispensing Apparatus 1R and Dispensing Method According to Third Embodiment In the dispensing apparatus 1R according to the third embodiment, the dispensing basic apparatus 1B described above (see FIG. 1) is used, and the setting unit 38 of the control unit U sets that (i) the extrusion sequentially goes through two stages (the final stage and the preceding stage) of movement speed mode ranges of the pressing tool 4, sets (ii) respective movement speeds in the movement speed mode ranges, and sets that (iii) the movement speed in the movement speed mode range of the preceding stage before the final stage is faster than the movement speed in the movement speed mode range of the final stage. Specifically, if the extrusion is performed by separately using each of the movement speeds v1, v2, v3 (v1>v2>v3) of the pressing tool 4, the relationship between the load f and the time t is as shown in a left view of FIG. 9 (the usual case); however, in the third embodiment, as shown in a right view of FIG. 9, the relatively fast speed v1 is used as the movement speed of the pressing tool 4 in the preceding stage of the extrusion, and v3 slower than v1 is used as the movement speed of the pressing tool 4 in the final stage of the extrusion. Moreover, as is the case with the second embodiment described above, the movement speed v3 is set to a speed at which a variation in weight of the cut metallic sodium 5 (the impulse P after movement stop) associated with a change in mass of the metallic sodium 5 in the extruder main body 3 falls within a predetermined allowable range (see FIG. 8: a relatively low movement speed v of the pressing tool 4).

As a result, by simply setting the movement speed v3 as the movement speed of the pressing tool 4 in the final stage, the impulse P after movement stop with respect to the metallic sodium 5 can be brought closer to a constant value in each extrusion as is the case with the second embodiment described above, and the variation in weight of the cut metallic sodium 5 can be suppressed in each extrusion without providing special control. Moreover, since the movement speed v3 is a low speed, the variation weight (variation amount relative to the reference) itself of the metallic sodium 5 can be reduced.

On the other hand, since v1 faster than v3 is used as the movement speed of the pressing tool 4 in the preceding stage before the final stage, the process time can be reduced as compared to the case of performing the whole of the extrusion operation at the movement speed v3 in the movement speed mode range of the final stage for extruding the metallic sodium 5 to a predetermined position.

In this case, even if the process time is extended due to the movement speed v3 of the pressing tool 4 in the final stage, the extension can be canceled by a reduction in the process time based on the movement speed v1 of the preceding stage before the final stage. Therefore, while suppressing an increase in the cycle time, the variation weight itself of the metallic sodium 5 cut in each extrusion can be made smaller and the variation in weight of the metallic sodium 5 can be suppressed without providing special control.

Figure 10:
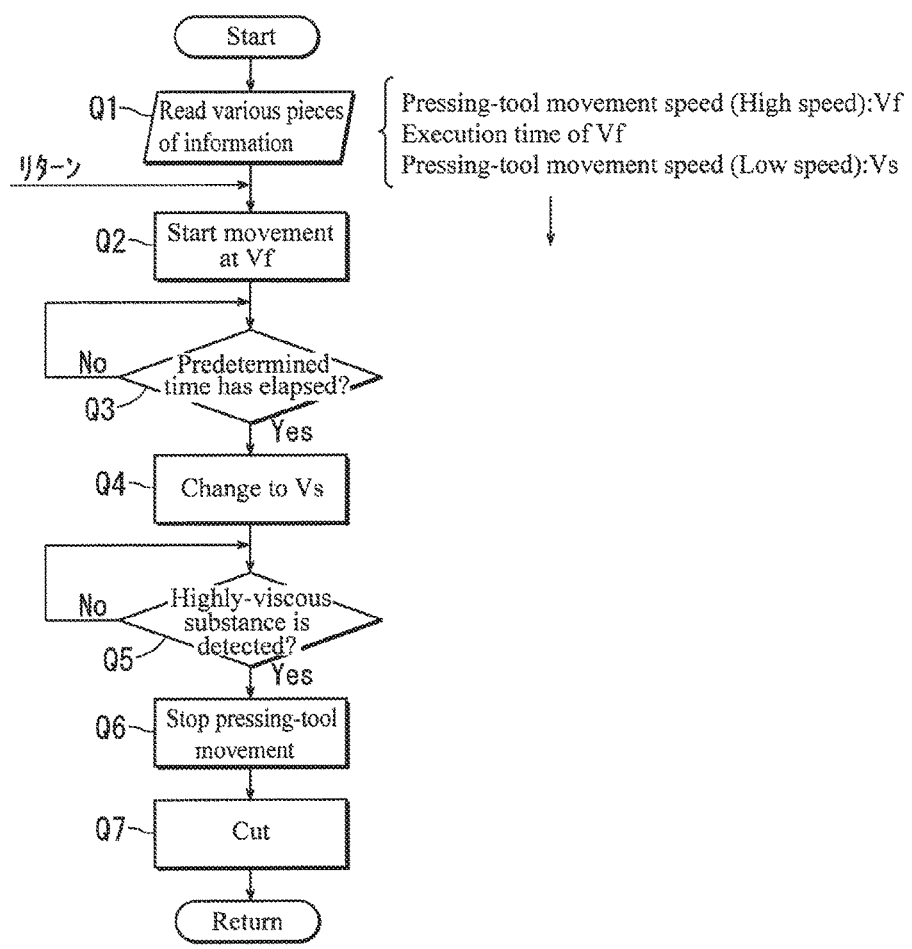
FIG. 10 is a flowchart of a control example of a control unit in the third embodiment

(2) Example of Control by Control Unit U in Dispensing Apparatus 1R According to Third Embodiment An example of control of the dispensing apparatus 1R according to the third embodiment will specifically be described with reference to a flowchart shown in FIG. 10. It is noted that Q stands for step.

First, at Q1, various pieces of information are read, including movement speeds vf (the movement speed (high speed) of the preceding stage) and vs (the movement speed (low speed) of the final stage) of the pressing tool 4, the execution time of the movement speed vf, etc.

After the various pieces of information are read, at Q2, the pressing tool 4 starts moving so as to move at the movement speed vf set by the setting unit 38, and the extrusion of the metallic sodium 5 from the nozzle 7 is started.

At next Q3, it is determined whether a predetermined time has elapsed from the start of extrusion of the metallic sodium 5. This predetermined time is the execution time of the movement speed vf, and this predetermined time is set to a time before the metallic sodium 5 reaches the predetermined position (the detection position of the metallic sodium detection sensor 37) with consideration given to the execution time of the movement speed vs of the pressing tool 4.

Figure 9:
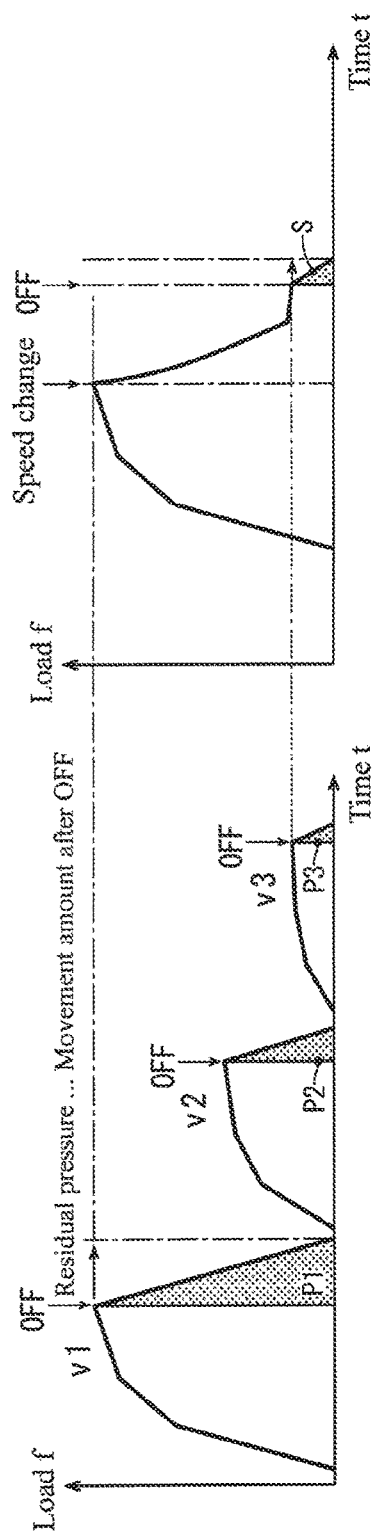
FIG. 9 is an explanatory diagram for explaining a third embodiment.

If Q3 is NO, this determination process is repeated and, on the other hand, if Q3 is YES, the movement speed of pressing tool 4 is changed to vs at Q4 (see the right view of FIG. 9). This is performed so as to achieve the same impulse P after movement stop as in the case of other extrusions.

At next Q5, it is determined whether the metallic sodium 5 used as a highly-viscous substance is detected. This is performed so as to determine whether the metallic sodium 5 is extruded until reaching the predetermined position from the nozzle 7. If Q5 is NO, this determination process is repeated and, on the other hand, if Q5 is YES, it is determined that the metallic sodium 5 has reached the predetermined position from the nozzle 7, so that the movement of the pressing tool 4 is stopped, and the linearly extruded metallic sodium 5 is cut (Q6, Q7).

(3) Example

Figure 11:
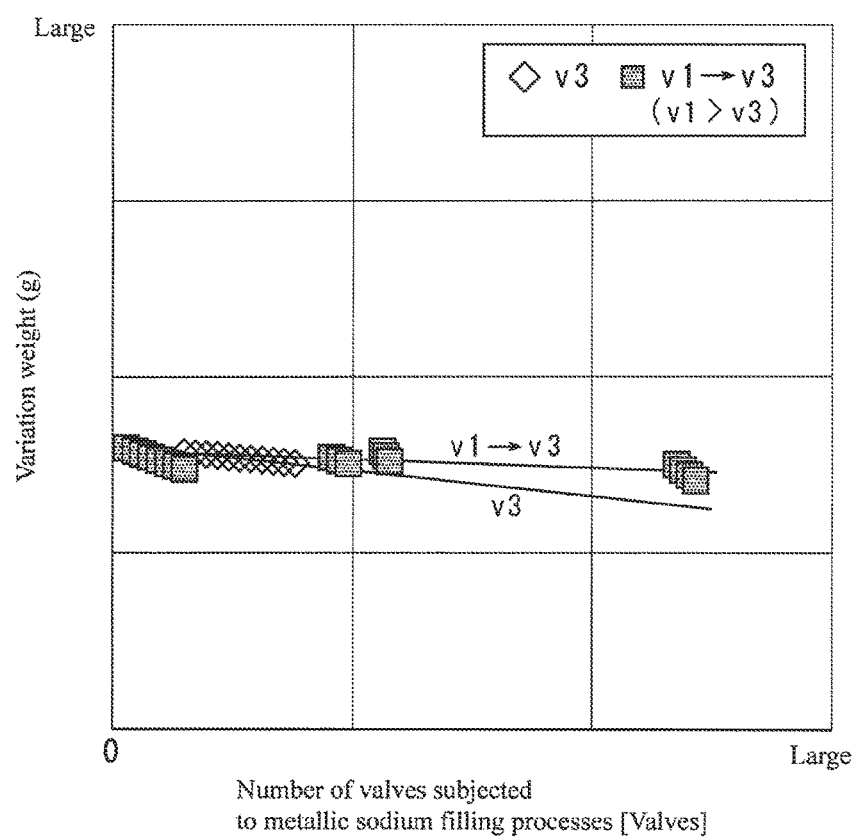
FIG. 11 is a diagram of a relationship between a variation weight and the number of valves subjected to metallic sodium filling processes in the case of using the third embodiment.

FIG. 11 shows a test example of the third embodiment.

In the test, the metallic sodium 5 was extruded with the movement speed of the pressing tool 4 in the preceding stage set to v1=0.9 (mm/sec) and the movement speed of the pressing tool 4 in the final stage set to v3=0.1 (mm/sec).

As a result, in the test example of the third embodiment, it was shown that even though the metallic sodium 5 was slightly extruded after stopping the movement of the pressing tool 4, the variation weight itself was the same small value as when the movement speed of the pressing tool 4 was set to v3=0.1 (mm/sec) throughout the extrusion, and that the variations in weight were substantially constant regardless of a mass change of the metallic sodium in the extruder main body 3.

Although the embodiments have been described, the present invention includes the following forms.

(1) An object used as a highly-viscous substance is not limited to metallic sodium and it is sufficient that the object is a clay-like substance.

(2) In the movement speed mode range of the final stage in the third embodiment, instead of selecting a speed on the low speed side as the movement speed v of the pressing tool 4, the feedback control is provided such that the impulse P after movement stop comes closer to the target impulse Ps after movement stop in each extrusion as is the case with the first embodiment.

EXPLANATIONS OF LETTERS OR NUMERALS 1R dispensing apparatus
1B dispensing basic apparatus
2 extruder
3 extruder main body
4 pressing tool
5 metallic sodium (highly-viscous substance)
7 nozzle
17 servomotor (pressing-tool driving means, pressing-tool drive adjusting means)
23 cutting tool
24 air cylinder (cutting-tool driving means)
25 air cylinder drive adjustment mechanism (cutting-tool drive adjusting means)
37 metallic sodium detection sensor (highly-viscous substance detecting means)
38 setting part (setting means)
39 control executing part (control executing means)
42 load sensor (impulse-related information detecting means)
43 changing part (changing means)
P impulse after movement stop
Ps target impulse after movement stop
U control unit (control means)

The invention claimed is:

1. A highly-viscous substance dispensing method including
extruding a highly-viscous substance loaded in an extruder main body from a nozzle of the extruder main body with a pressing tool moving in the extruder main body, and
cutting the extruded highly-viscous substance after stopping the movement of the pressing tool when it is detected that the highly-viscous substance is extruded to a predetermined position,
adjusting the movement speed of the pressing tool such that an impulse after the pressing-tool movement stop with respect to the highly viscous substance is brought closer to a constant value until a load no longer acts on the highly-viscous substance in the extruder main body after stopping the movement of the pressing tool.

2. The highly-viscous substance dispensing method according to claim 1,
wherein a target impulse after the pressing-tool movement stop is set as the constant value, and
wherein the movement speed adjustment of the pressing tool is performed by changing a next movement speed of the pressing tool such that the impulse after the pressing-tool movement stop comes closer to the target impulse.

3. The highly-viscous substance dispensing method according to claim 2,
wherein the next movement speed of the pressing tool is changed such that when the impulse after the pressing-tool movement stop is larger than the target impulse, the next movement speed of the pressing tool is made lower than a current movement speed of the pressing tool, and that when the impulse after the pressing-tool movement stop is smaller than the target impulse, the next movement speed of the pressing tool is made higher than the current movement speed of the pressing tool.

4. The highly-viscous substance dispensing method according to claim 1,
wherein the movement speed adjustment of the pressing tool is performed by selecting as the movement speed of the pressing tool a movement speed at which the impulse after the pressing-tool movement stop associated with a mass change of the highly-viscous substance in the extruder main body falls within a predetermined allowable range.

5. The highly-viscous substance dispensing method according to claim 1,
wherein the highly-viscous substance is extruded with the pressing tool sequentially through a plurality of stages of movement speed mode ranges,
wherein the impulse after the pressing-tool movement stop is brought closer to a constant value by adjusting the movement speed in the movement speed mode range of a final stage out of the plurality of stages of movement speed mode ranges, and
wherein the movement speed in the movement speed mode range of a preceding stage before the movement speed mode range of the final stage is made faster than the movement speed in the movement speed mode range of the final stage.

6. The highly-viscous substance dispensing method according to claim 5,
wherein a target impulse after pressing-tool movement stop is set as the constant value, and
wherein the movement speed adjustment of the pressing tool in the final stage is performed by changing a next pressing-tool movement speed in the final stage such that the impulse after the pressing-tool movement stop comes closer to the target impulse.

7. The highly-viscous substance dispensing method according to claim 5, wherein the movement speed adjustment of the pressing tool in the final stage is performed by selecting as the movement speed of the pressing tool a movement speed at which the impulse after the pressing-tool movement stop associated with a mass change of the highly-viscous substance in the extruder main body falls within a predetermined allowable range.

8. The highly-viscous substance dispensing method according to claim 1, wherein the highly-viscous substance is metallic sodium.

9. A highly-viscous substance dispensing apparatus extruding a highly-viscous substance loaded in an extruder main body from a nozzle of the extruder main body with a pressing tool moving in the extruder main body, and cutting the extruded highly-viscous substance after stopping the movement of the pressing tool when it is detected that the highly-viscous substance is extruded to a predetermined position, the apparatus comprising:
 a pressing-tool drive adjusting device that moves a pressing-tool and that adjusts the speed of movement of the pressing tool;
 a cutting-tool drive adjusting device driving and adjusting a cutting-tool driver driving the cutting tool;
 a highly-viscous substance detector detecting that the highly-viscous substance extruded from the nozzle of the extruder reaches a predetermined position;
 a setting device setting a movement speed of the pressing tool;
 a control executing device moving the pressing tool by adjusting the pressing-tool drive adjusting device based on information from the setting device, the control executing device controlling the pressing-tool drive adjusting device to stop the movement of the pressing tool and controlling the cutting-tool drive adjusting device to cut the highly-viscous substance when determining that the highly-viscous substance extruded from the nozzle of the extruder reaches the predetermined position based on information from the highly-viscous substance detector; and
 a movement speed adjustor that adjusts an impulse after the pressing-tool movement stop with respect to the highly viscous substance closer to a constant value until a load no longer acts on the highly-viscous substance in the extruder main body after stopping the movement of the pressing tool.

10. The highly-viscous substance dispensing apparatus according to claim 9,
 wherein the setting device sets a target impulse after pressing-tool movement stop, and
 wherein the movement speed adjustor includes an impulse-related information detector detecting information related to the impulse after the pressing-tool movement stop, and a changing device deriving the impulse after the pressing-tool movement stop based on information from the impulse-related information detector and changing the movement speed of the pressing tool set by the setting device such that the impulse after the pressing-tool movement stop comes closer to the target impulse.

11. The highly-viscous substance dispensing apparatus according to claim 10,
 wherein the changing device is set such that when the impulse after the pressing-tool movement stop is higher than the target impulse, a next movement speed of the pressing tool is made lower than a current movement speed of the pressing tool and that when the impulse after pressing-tool movement stop is lower than the target impulse after the pressing-tool movement stop, the next movement speed of the pressing tool is made higher than the current movement speed of the pressing tool.

12. The highly-viscous substance dispensing apparatus according to claim 9,
 wherein the setting device sets the movement speed of the pressing tool as the movement speed adjustor such that the impulse after the pressing-tool movement stop associated with a mass change of the highly-viscous substance in the extruder main body falls within a predetermined allowable range.

13. The highly-viscous substance dispensing apparatus according to claim 9,
 wherein the setting unit sets that the highly-viscous substance is extruded with the pressing tool sequentially through a plurality of stages of movement speed mode ranges, sets respective movement speeds in the movement speed mode ranges, and sets that the movement speed in the movement speed mode range of a preceding stage before a final stage out of the plurality of stages of movement speed mode ranges is faster than the movement speed in the movement speed mode range of the final stage, and
 wherein the movement speed adjustor is set to bring the impulse after the pressing-tool movement stop closer to a constant value by adjusting the movement speed in the movement speed mode range of the final stage.

14. The highly-viscous substance dispensing apparatus according to claim 13,
 wherein the setting device sets a target impulse after pressing-tool movement stop,
 wherein the movement speed adjustor includes an impulse-related information detector detecting information related to the impulse after the pressing-tool movement stop, and a changing device deriving the impulse after the pressing-tool movement stop based on information from the impulse-related information detector and changing the movement speed in the movement speed mode range of the final stage set by the setting device such that the impulse after the pressing-tool movement stop comes closer to the target impulse.

15. The highly-viscous substance dispensing apparatus according to claim 13,
 wherein the setting device sets the movement speed in the movement speed mode range of the final stage as the movement speed adjustor such that the impulse after the pressing-tool movement stop associated with a mass change of the highly-viscous substance in the extruder main body falls within a predetermined allowable range.

16. The highly-viscous substance dispensing apparatus according to claim 9, wherein the highly-viscous substance is metallic sodium.

* * * * *